(12) United States Patent
Bertalmino

(10) Patent No.: US 6,675,397 B1
(45) Date of Patent: Jan. 13, 2004

(54) REDUCES THE AMOUNT OF WATER FLOW IN TOILETS

(76) Inventor: Albert Bertalmino, 646 Hillcrest Ave., Elmhurst, IL (US) 60126

( * ) Notice: Subject to any disclaimer, the term of this patent is extended or adjusted under 35 U.S.C. 154(b) by 0 days.

(21) Appl. No.: 10/350,416

(22) Filed: Jan. 24, 2003

Related U.S. Application Data

(60) Provisional application No. 60/350,810, filed on Jan. 24, 2002.

(51) Int. Cl.[7] .................................................. E03D 1/14
(52) U.S. Cl. .................................................. 4/326; 4/324
(58) Field of Search ........................... 4/326, 325, 324, 4/345, 415

(56) References Cited

U.S. PATENT DOCUMENTS

| | | | |
|---|---|---|---|
| 3,795,016 A | * 3/1974 | Eastman | 4/326 |
| 4,056,856 A | * 11/1977 | Reid et al. | 4/326 |
| 4,110,850 A | * 9/1978 | Tedei | 4/326 |
| 4,141,092 A | * 2/1979 | Jones | 4/324 |
| 4,172,299 A | 10/1979 | del Pozo | |
| 4,353,138 A | * 10/1982 | Bell | 4/326 |
| 4,829,605 A | * 5/1989 | Agostino | 4/326 |
| 5,175,893 A | 1/1993 | Navarrete | |
| 5,511,253 A | 4/1996 | Zamudio-Castillo | |
| 6,484,327 B2 | * 11/2002 | Hand | 4/326 |
| 6,574,803 B2 | * 6/2003 | Idone | 4/326 |

* cited by examiner

Primary Examiner—Gregory Huson
Assistant Examiner—Huyen Le
(74) Attorney, Agent, or Firm—Matthew J. Peirce

(57) ABSTRACT

An apparatus for use within toilet tanks is disclosed. The apparatus would be a modified flush system in which a user would be allowed to flush one of two different flush levers attached to the toilet after use. Each of the flush levers would allow a different amount of water to flow from the toilet tank into the toilet to evacuate the contents of the toilet. One of the flush levers could be used in normal water conditions, while the other flush lever could be used in drought conditions or times in which water conservation must be observed.

2 Claims, 1 Drawing Sheet

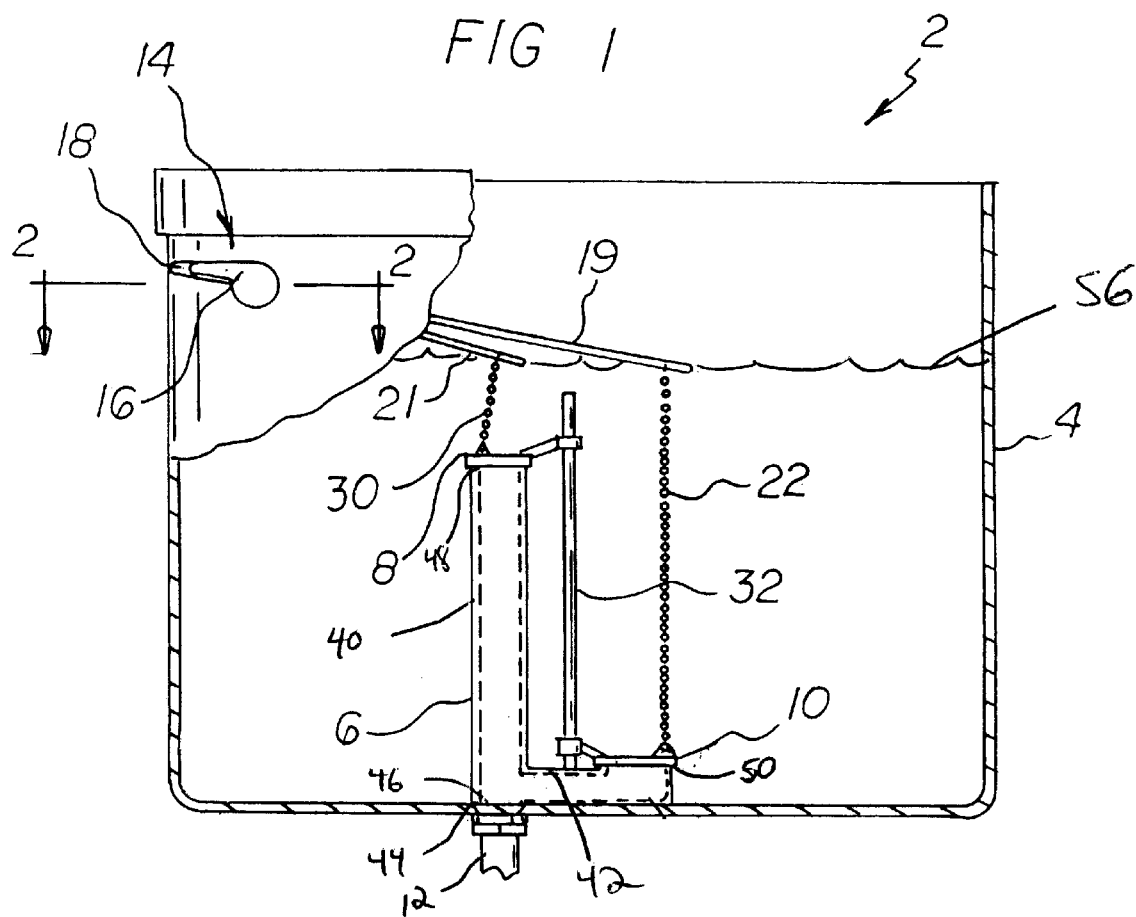
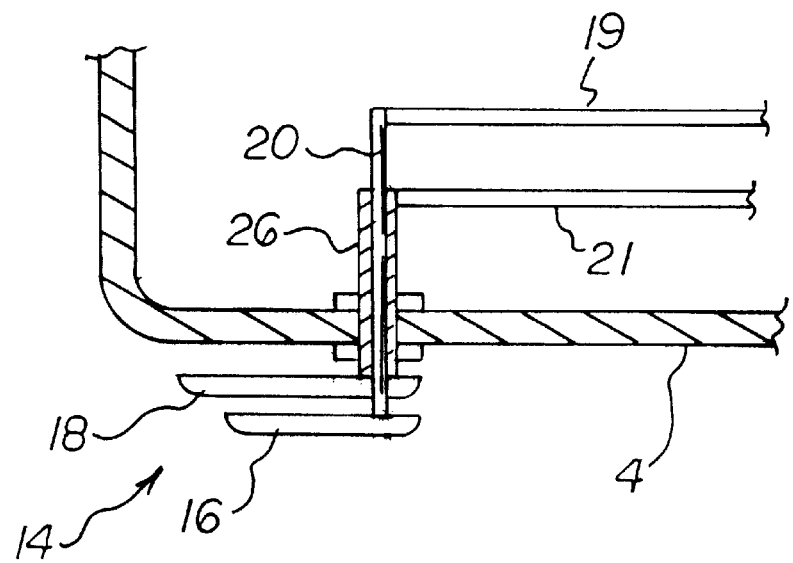

REDUCES THE AMOUNT OF WATER FLOW IN TOILETS

This application claims benefit of Provisional No. 60/350,810 filed Jan. 24, 2002.

I. BACKGROUND OF THE INVENTION

The present invention concerns that of a new and improved apparatus for use within toilet tanks.

II. DESCRIPTION OF THE PRIOR ART

U.S. Pat. No. 5,511,253, issued to Zamudio-Castillo, discloses a dual toilet flush system for conserving water by varying the volume of discharged water.

U.S. Pat. No. 5,175,893, issued to Navarrete, discloses appears to show a flush valve for a toilet comprised of two levers and flap valves allowing for various measured amounts of water to be dispensed.

U.S. Pat. No. 4,172,299, issued to del Pozo, discloses a dual toilet flush system for conserving water by varying the volume of discharged water.

III. SUMMARY OF THE INVENTION

The present invention concerns that of a new and improved apparatus for use within toilet tanks. The apparatus would be a modified flush system in which a user would be allowed to flush one of two different flush levers attached to the toilet after use. Each of the flush levers would allow a different amount of water to flow from the toilet tank into the toilet to evacuate the contents of the toilet. One of the flush levers could be used in normal water conditions, while the other flush lever could be used in drought conditions or times in which water conservation must be observed.

There has thus been outlined, rather broadly, the more important features of an apparatus for use within toilet tanks that the detailed description thereof that follows may be better understood and in order that the present contribution to the art may be better appreciated. There are, of course, additional features of the apparatus for use within toilet tanks that will be described hereinafter and which will form the subject matter of the claims appended hereto.

In this respect, before explaining at least one embodiment of the apparatus for use within toilet tanks in detail, it is to be understood that the apparatus for use within toilet tanks is not limited in its application to the details of construction and to the arrangements of the components set forth in the following description or illustrated in the drawings. The apparatus for use within toilet tanks is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present apparatus for use within toilet tanks. It is important, therefore, that the claims be regarded as including such equivalent constructions insofar as they do not depart from the spirit and scope of the present invention.

It is therefore an object of the present invention to provide an apparatus for use within toilet tanks which has all of the advantages of the prior art and none of the disadvantages.

It is another object of the present invention to provide an apparatus for use within toilet tanks which may be easily and efficiently manufactured and marketed.

It is another object of the present invention to provide an apparatus for use within toilet tanks which is of durable and reliable construction.

It is yet another object of the present invention to provide an apparatus for use within -toilet tanks which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

FIG. 1 shows a schematic view of the toilet tank apparatus that would be installed in existing toilet tanks.

FIG. 2 shows a schematic view of the toilet tank apparatus that would be installed in newly installed toilet tanks.

V. DESCRIPTION OF THE PREFERRED EMBODIMENT

Priority is hereby claimed to application Ser. No. 60/350,810, filed on Jan. 24, 2002.

FIG. 1 shows a schematic view of the toilet tank apparatus 2 that would be installed in existing toilet tanks 4, while FIG. 2 shows a top schematic of the toilet tank apparatus 2. Toilet tank 4 would have an open top and would have a volume of water 56 within toilet tank 4.

Apparatus 2 would comprise a protective rubber coated L-shaped insert 6. Insert 6 would have two sections, a long section 40 and a short section 42, with the long section 40 being attached to the short section 42 at a ninety degree angle. Insert 6 has two ends, a first end and a second end, with the first end of the L-shaped insert being the unattached end of the long section 40 and the second end of the L-shaped insert being the unattached end of the short section 42. Both the long section 40 and the short section 42 of the L-shaped insert 6 have a continuous side surface. Stopper 8 is placed over hole 48 on the first end of insert 6, while stopper 10 is placed over hole 50 near the second end of insert 6.

Insert 6 is placed firmly over exit pipe 12, which is connected to the toilet tank 4 by exit hole 44 and allows water to leave the toilet tank 4 and enter into a toilet bowl. The insert 6 would be placed over the exit hole such that the long section 40 of the L-shaped insert 6 is vertical and on top of the exit hole 44 and the short section 42 of the L-shaped insert 6 is horizontal on the bottom of the toilet tank 4. An insert hole 46 on the insert 6 would allow water within the insert to flow through exit hole 44 through the exit pipe 12 onto an attached toilet bowl.

Apparatus 2 also includes two-pronged lever 14 which comprises outer lever 16 and inner lever 18. Outer lever 16 is attached to rod 20 which has two ends, a first end and a second end. The first end of outer lever 16 is connected to the first end of rod 20, while the second end of rod 20 is connected to the first end of branch 19. The second end of branch 19 has attached chain 22, which is also connected to stopper 10. When outer lever 16 would be turned, the rotation of rod 20 would cause branch 19 to raise up, temporarily pulling stopper 10 off the second end of the insert 6, causing the water within the toilet tank 4 to lower to the level of the second end of insert 6.

Inner lever 18 is attached to rod 26, which actually looks like a tube and envelops and surrounds rod 20 and is coaxial with rod 20. Rod 26 has two ends, a first end and a second end. The first end of inner lever 18 is connected to the first end of rod 26, while the second end of rod 26 is connected to the first end of branch 21. The second end of branch 21 has attached chain 30, which is also connected to stopper 8. When inner lever 18 would be turned, the rotation of rod 26 would cause branch 21 to raise up, temporarily pulling stopper 8 off the first end of the insert 6, causing the water within the toilet tank 4 to lower to the level of the first end of insert 6.

The unit would also have an overflow pipe 32, which would have two ends, a top end and a bottom end. The bottom end of the pipe 32 would be inserted into the short section 42 of the insert 6 and would be mounted vertically within the toilet tank 4. which would be connected to the insert 6 to ensure that the water within the toilet tank 4 would not overflow. The plumbing entering into the toilet tank 4 to fill the toilet tank 4 after the toilet has been flushed are not shown in FIG. 1 or 2.

The apparatus 2 would be used in both existing toilets and newly installed toilets. installed in newly installed toilet tanks.

What I claim as my invention is:

1. A toilet tank apparatus in combination with a toilet, the apparatus comprising:

(a) a toilet tank, the top of the toilet tank being open, the toilet tank having a bottom, (b) a volume of water within the toilet tank, (c) an exit hole located in the bottom of the toilet tank connecting the toilet tank to the toilet, (d) an L-shaped insert having two sections, a long section and a short section, the long section being attached to the short section at a ninety degree angle, the L-shaped insert having two ends, a first end and a second end, the first end of the L-shaped insert being the unattached end of the long section, the second end of the L-shaped insert being the unattached end of the short section, both the long section and the short section of the L-shaped insert having a continuous side surface, the L-shaped insert being placed over the exit hole such that the long section of the L-shaped insert is vertical and on top of the exit hole and the short section of the L-shaped insert is horizontal on the bottom of the toilet tank, (e) an insert hole located on the L-shaped insert immediately above the location of the exit hole, (f) a pair of stopper holes comprising a first stopper hole and a second stopper hole, the first stopper hole located on the first end of the L-shaped insert, the second stopper hole located on a side surface near the second end of the L-shaped insert, the second stopper hole facing upward, (g) a pair of flush levers comprising a first flush lever and a second flush lever, each lever having two ends comprising a first end and a second end, (h) a pair of rods comprising a first rod and a second rod, each rod having two ends comprising a first end and a second end, the first end of the first flush lever connected to the first end of the first rod, the first end of the second flush lever connected to the first end of the second rod, (i) a pair of branches comprising a first branch and a second branch, each branch having two ends comprising a first end and a second end, the first end of the first branch connected to the second end of the first rod, the first end of the second branch connected to the second end of the second rod, (j) a pair of chains comprising a first chain and a second chain, each chain having two ends comprising a first end and a second end, the first end of the first chain connected to the second end of the first branch, the first end of the second chain connected to the second end of the second branch, (k) a pair of stoppers comprising a first stopper and a second stopper, the first stopper being placed over the first stopper hole, the second stopper being placed over the second stopper hole, the second end of the first chain connected to the first stopper, the second end of the second chain connected to the second stopper, (l) an overflow pipe having two ends comprising a top end and a bottom end, the bottom end being inserted into the short section of the L-shaped insert, the overflow pipe being placed in a vertical position, the top end of the overflow pipe being open, (m) wherein a user would choose to one of the two flush levers to flush the toilet, further wherein each of the two flush levers would cause different amounts of water within the toilet tank to be released into the toilet.

2. A toilet tank apparatus in combination with a toilet according to claim 1 wherein the first rod and the second rod would be coaxial, and further wherein the second rod would envelop and surround the first rod.

* * * * *